Aug. 24, 1965  J. R. BAITTINGER  3,201,834
TIMBER PILE CONNECTOR
Filed Sept. 18, 1961  3 Sheets-Sheet 1
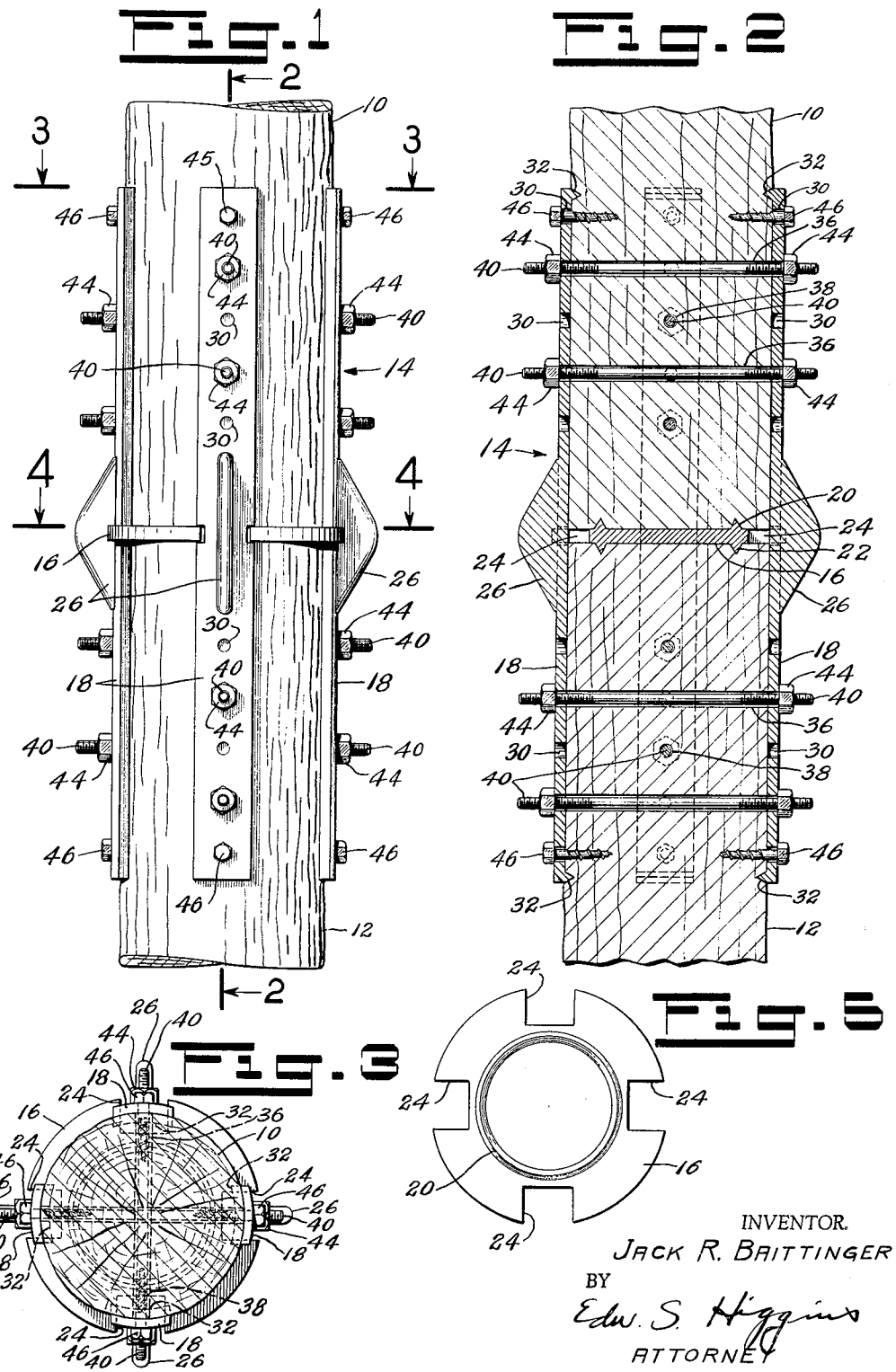
INVENTOR.
JACK R. BAITTINGER
BY
Edw. S. Higgins
ATTORNEY

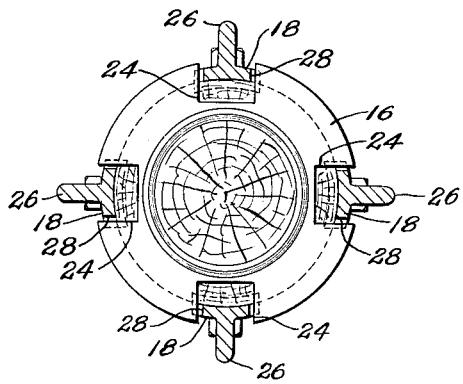
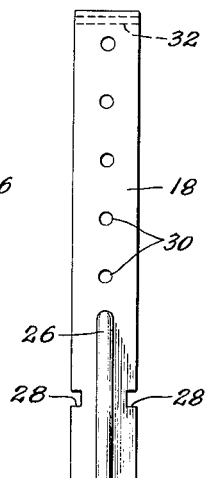
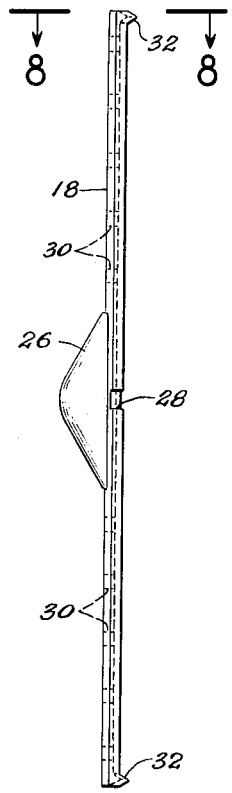
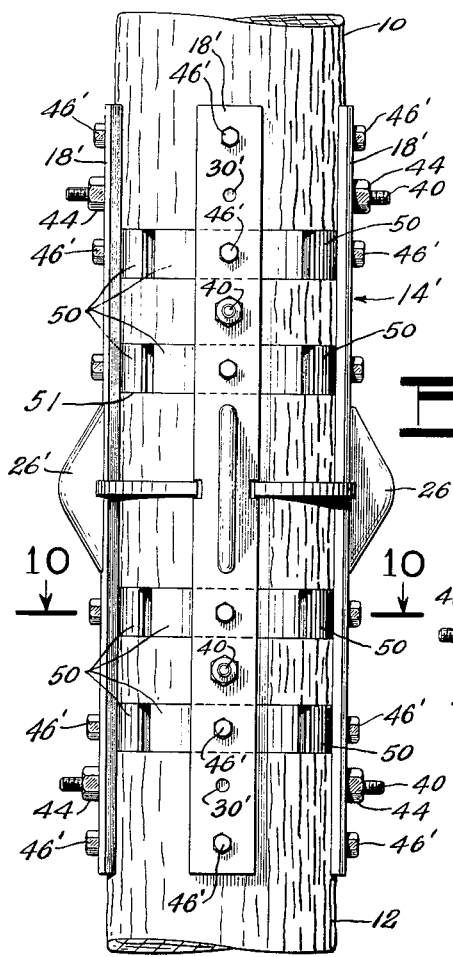
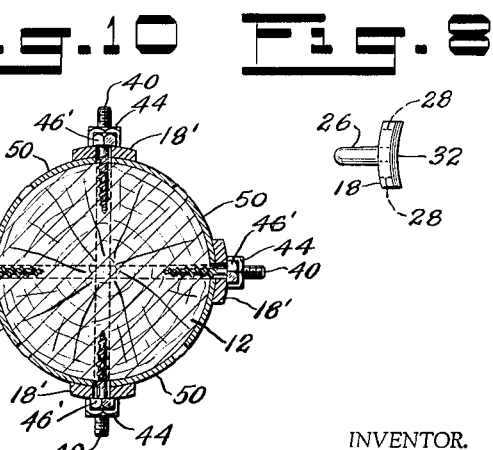

Aug. 24, 1965    J. R. BAITTINGER    3,201,834
TIMBER PILE CONNECTOR
Filed Sept. 18, 1961    3 Sheets-Sheet 3
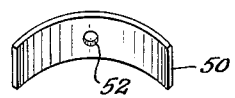
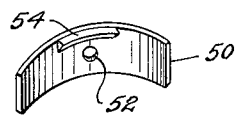
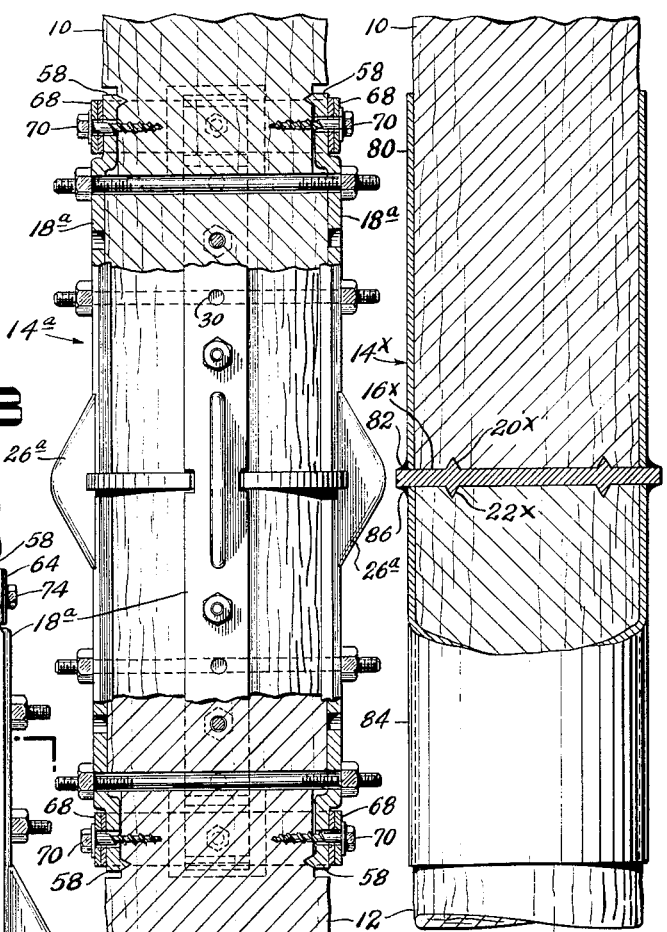
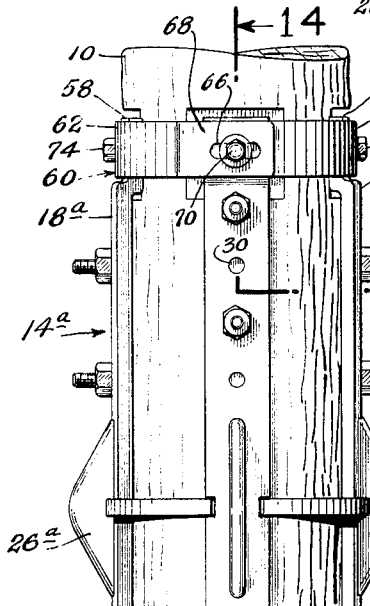
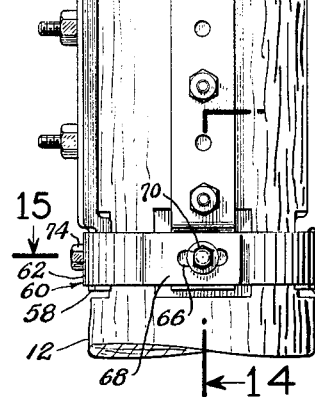
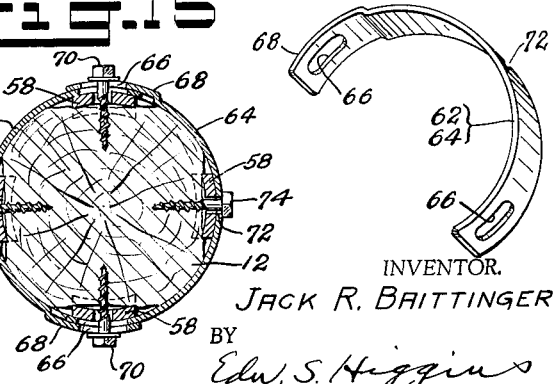
INVENTOR.
JACK R. BAITTINGER
BY
Edw. S. Higgins
ATTORNEY

United States Patent Office 3,201,834
Patented Aug. 24, 1965

3,201,834
TIMBER PILE CONNECTOR
Jack R. Baittinger, Scotch Plains, N.J., assignor of one-half to John J. Dougherty, Cedar Grove, N.J.
Filed Sept. 18, 1961, Ser. No. 138,655
1 Claim. (Cl. 20—92)

This invention relates generally to piling and more particularly to connectors and method of connecting timber piles in end to end upright position.

Piles are used to support or to form foundations for stuctures such as buildings, banks, bridges, conduits, piers, wharves, etc. by driving them into or through the yielding surface strata far enough to obtain a solid support for the principal structure.

Lengths or sections of timber piles are often used for this purpose. However it is objectionable to join such timber lengths or sections in abutting end to end relation as the wooden fibers have a tendency to become embedded in the end surfaces and damage the ends of the lengths or sections. Such abutting end to end joints are also likely to break and to separate under tension.

It is accordingly a principal object of the present invention to provide a fitting or connector for joining lengths or sections of timber piles with means for preventing them from contacting each other at their ends yet provides a positive bond between the ends thereby ensuring complete structural stability between the lengths or sections of piles.

Another object of the invention is to provide a fitting or connector that will effectively join two timber pile lengths or sections placed in end to end relation, preventing separation of the lengths or sections by breaking under tension.

A further object of the invention is to provide a fitting or connector for two lengths of timber pile that is rigid and rugged in construction, increasing the uplift capacity thereof and imparting a bending moment thereto.

It is also an object of the invention to provide a fitting or connector for joining timber pile lengths or sections with means for reinforcing and strengthening the ends of the lengths or sections and preventing displacement of the lengths or sections.

Still another object is to provide a connector of this kind that is economical to manufacture and that can be sold at a reasonable cost.

For further comprehension of the benefits and advantages of the invention, reference will be had to the accompanying drawings and to the following description.

In the accompanying drawings forming a material part of this disclosure:

FIG. 1 is a side elevational view of a connector embodying one form of the invention joining two sections of timber pile.

FIG. 2 is a vertical sectional view taken on the line 2—2 of FIG. 1.

FIG. 3 is a cross-sectional view taken on the line 3—3 of FIG. 1.

FIG. 4 is a cross-sectional view taken on the line 4—4 of FIG. 1.

FIG. 5 is a top plan view of a skid plate.

FIG. 6 is a front elevational view of a side bar.

FIG. 7 is an edge view thereof.

FIG. 8 is an end view as seen from the line 8—8 of FIG. 7.

FIG. 9 is a view similar to FIG. 1 of a connector embodying a modified form of the invention.

FIG. 10 is a cross-sectional view taken on the line 10—10 of FIG. 9.

FIGS. 11 and 12 are perspective views of the ring segments shown in FIG. 9.

FIG. 13 is a view similar to FIG. 1 of a connector embodying another modified form of the invention.

FIG. 14 is a vertical sectional and elevational view taken on the line 14—14 of FIG. 13.

FIG. 15 is a cross-sectional view taken on the line 15—15 of FIG. 13.

FIG. 16 is a perspective view of one of the end ring segments of FIG. 13.

FIG. 17 is a view similar to FIG. 1 of a connector embodying a still further modified form of the invention, parts being broken away.

Referring in detail to the drawings, a connector fitting for joining the ends of two timber piles 10 and 12 is shown in FIG. 1 and is designated generally by the reference numeral 14. The fitting broadly consists of a central metal plate 16 and a plurality of vertically disposed elongated side supporting bars 18 spaced around and supported by the plate midway their ends. Four of such side bars 18 are shown.

The plate 16 has smooth upper and lower surfaces and is formed with an annular spur or flange 20 on its upper surface as viewed in FIGS. 1 and 2 adjacent the periphery thereof, and with a similar annular spur or flange 22 on its lower surface adjacent the periphery thereof. Opposed square-shaped notches 24 are formed in the periphery of the skid plate to receive said bars 18 midway their ends.

The side bars 18 midway their ends are formed with substantially triangular shaped lugs 26 along the centers thereof. The lugs are formed integrally with the bars and serve to reinforce and strengthen the bars at these points. A pair of opposed notches 28 are formed in the long edges of the bars midway their ends, the top edge walls of the notches seating on the top surface of the skid plate and the edge walls of the notches interlocking with the edge walls of the opposed notches 24 in the skid plate. Each side bar is formed with a plurality of spaced holes 30 along the center thereof, and at the end of each side bar a knife edge flange 32 is formed across the same. The side bars 18 are slightly curved in cross-section to conform to the curvature of the round timber pile.

In using the fitting 14, the plate 16 is placed on the top surface of the timber 12 and the annular depending flange 22 driven thereinto. The timber 10 is then placed on top of the plate and driven downwardly so that the upstanding flange 20 on the top of the plate penetrates the bottom surface of the pile 10. The side bars 18 are then positioned in the slots 24 of the skid plate and interlocked therewith. The skid screws 40 are next driven through the end holes 30 in the side bars whereby the flanges 32 are driven home into the material of the timber piles. A series of horizontal openings 36 are drilled through the holes 30 in the side bars completely through the axial centers of the timber piles 10 and 12 from side to side. In one direction. Another series of horizontal openings 38 are drilled in a similar manner in a direction at right angles to the openings 36 and at different horizontal planes. Bolts 40 with threaded ends are inserted through the aligned holes and openings with both ends of the bolts protruding. Ntus 44 threaded onto the ends fasten the side bars to the timber piles.

It will be noted that the lugs 26 are disposed across the juncture between the abutting ends of the timber piles, the line of weakest resistance.

The modified form of fitting 14' shown in FIGS. 9 to 11, inclusive, differs from the fitting 14 shown in FIGS. 1 to 8, inclusive, in that a plurality of arcuate-shaped members 50, constituting segments of a circle and having holes 52 midway their ends are carried by the side bars 18' at spaced intervals therealong. The members 50 are secured in place on the side bars and in pressing contact with the timber piles in annular grooves 51 in the peripheries of the timber piles by means of lag screws 46' passing through the holes 30' in the side bars 18' and the holes 52 in the members 50.

In all other respects, the fitting 14' is similar to the fitting 14 and similar reference numerals are used to indicate similar parts.

In FIG. 12, a modified form of arcuate-shaped member 50 is shown having a curved flange 54 with knife edge for biting into the material of the timber pile when the lag screws 46' are driven home.

Referring now to the modified form of fitting 14ª shown in FIGS. 13 to 16, inclusive, this form differs from the fitting 14 of FIG. 1 in that the ends 58 of each of the side bars 18ª are offset inwardly from the plane of the body of the bar. A split ring or annular members 60 encircles the offset ends at each end of the bars. The ring or annular member is composed of a pair of semi-annular members 62 and 64, each having elongated closed slots 66 at both ends and each having one end offset outwardly from the plane of the body of the member as indicated at 68 so that the offset end 68 of one semi-annular member is adapted to overlap the plane adjacent end of the other semi-annular member as seen in FIG. 15. A lag screw 70 extends loosely through the aligned slots 66 and penetrates the material of the timber pile securing the split rings in position, the screws 70 passing through holes in the offset ends of the side bars 18ª. Each semi-annular member is also formed with a hole 72 midway its ends adapted to register with a hole in the offset end of the respective side bar in order to receive lag screws 74.

Another modification of the invention is shown in FIG. 17 wherein is shown a fittng 14ˣ consisting of a skid plate 16ˣ with an annular upstanding pointed flange 20ˣ on the upper surface thereof and a depending annular flange 22ˣ on the lower surface. A hollow cylindrical shell 80 is seated around the periphery of the skid plate and secured in position by welding as indicated at 82. A hollow cylindrical shell 84 depends from the skid plate and is fastened to the periphery thereof by welding as indicated at 86.

The shell 84 is slipped over the top end of the timber pile 12 and the timber pile 10 is lowered into the shell 80 and driven downwardly and the pressure on pile 10 will force the flanges 20ˣ and 22ˣ into the material of the piles. Both piles are thus secured in position for driving.

While I have illustrated and described the preferred embodiments of my invention, it is to be understood that various other modifications and changes in details might be made without departing from the principles of the invention and I desire therefore to be limited only by the state of the prior art and the appended claim.

I claim:

A pile comprising a lower wooden pile section, an upper wooden pile section superimposed on the lower pile section, said pile sections having spaced annular grooves therealong, a connector fitting interposed between and joining said pile sections, said connector fitting including a circular plate between the abutting ends of the pile sections, said plate having pairs of diametrically opposed notches in its periphery, side bars spaced around the plate, said side bars engaged in the notches and extending above and below the plate, said side bars having a series of spaced holes therealong, said pile sections having a series of spaced openings through said axial centers thereof, from side to side, in one direction and another series of spaced openings through the axial centers thereof from side to side in a direction at right angles to the direction of said first series of openings, bolts passing through the aligned holes and openings and protruding beyond the side bars, nuts on the ends of the bolts and connecting opposed side bars, elongated lugs on the side bars extending beyond both sides of the plate, and knife edges on the inner surfaces of said side bars at the ends thereof, a series of arcuate shaped members carried at spaced intervals along the side bars and seated in the grooves in the pile sections, curved knife edge flanges on the top edges of the inner surfaces of the arcuate-shaped member and penetrating the pile, said knife edge flanges conforming to the curvature of the arcuate-shaped members and means extending through the side bars and the arcuate shaped members to prevent relative movement between the side bars and the arcuate shaped members.

References Cited by the Examiner

UNITED STATES PATENTS

| 195,820 | 10/77 | Hubbard | 20—92 X |
|---|---|---|---|
| 201,170 | 3/78 | Dyer | 20—99 |
| 417,561 | 12/89 | Hyatt | 217—44 |
| 639,193 | 12/99 | Alliger | 217—44 |
| 841,489 | 1/07 | Drane | 20—99 |
| 1,042,187 | 10/12 | Backes | 20—99 X |
| 1,371,134 | 3/21 | West | 151—42 |
| 1,426,232 | 8/22 | Theodorsen | 20—92 |
| 1,486,444 | 3/24 | Malmgren | 20—92 X |
| 1,690,824 | 11/28 | Kondolf | 217—69 |
| 1,907,022 | 5/33 | Warren | 217—91 |
| 2,026,157 | 12/35 | Beecher | 20—99 |
| 2,090,972 | 8/37 | Allen | 20—99 |
| 2,222,481 | 11/40 | Ferguson | 61—53 X |
| 2,821,069 | 1/58 | Fox | 61—53 |

FOREIGN PATENTS

| 520,135 | 2/21 | France. |
|---|---|---|
| 611,100 | 6/26 | France. |
| 633,699 | 10/27 | France. |
| 13,524 | 9/25 | Holland. |
| 15,445 | 8/06 | Norway. |
| 67,624 | 3/44 | Norway. |
| 85,932 | 3/36 | Sweden. |
| 280,605 | 5/52 | Switzerland. |

FRANK L. ABBOTT, *Primary Examiner.*

WILLIAM I. MUSHAKE, JACOB L. NACKENOFF,
*Examiners.*